United States Patent Office 3,392,268
Patented July 9, 1968

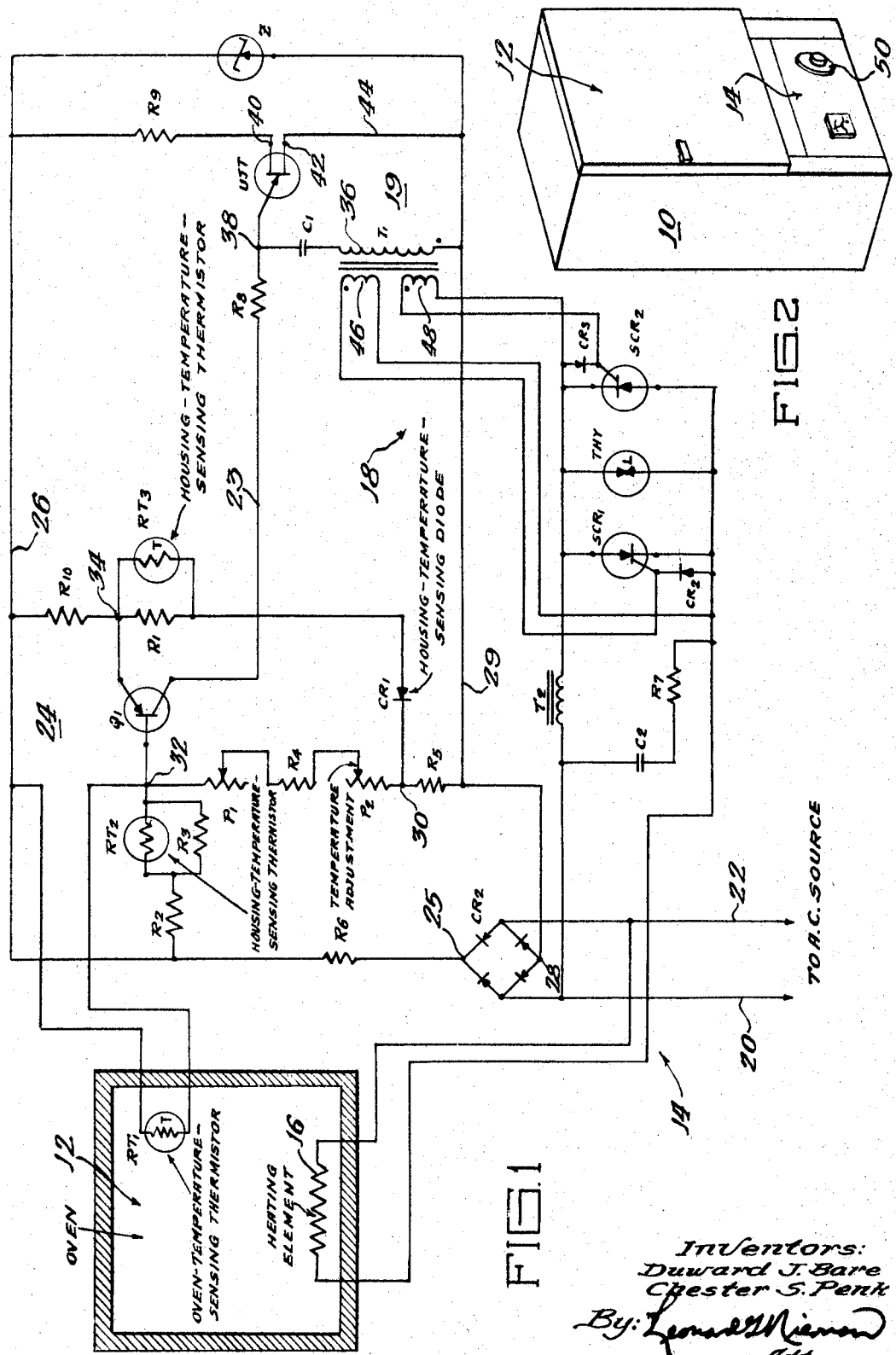

3,392,268
OVEN AND TEMPERATURE CONTROL SYSTEM THEREFOR
Duward J. Bare, Riverdale, and Chester S. Penk, Crestwood, Ill., assignors to Blue M Electric Company, Blue Island, Ill., a corporation of Illinois
Filed Apr. 20, 1967, Ser. No. 632,244
9 Claims. (Cl. 219—413)

ABSTRACT OF THE DISCLOSURE

An oven unit having a temperature control system including a transistor circuit which is responsive to deviation of oven temperature from a preset value within a wide range of selectable temperatures and which controls the power supplied to the oven-heater to restore the preset temperature. Thermistors are provided in separate electrode branches of the transistor circuit to compensate for variations in the transistor characteristics with changes in its ambient temperature, one thermistor providing the principal compensating effect when the oven temperature is within the lower portion of the range, and another thermistor providing the principal compensating effect when the oven temperature is within the upper portion of the range.

---

The present invention relates to controlled-temperature apparatus having a temperature control circuit employing a transistor or other similar current-controlling element whose characteristics vary with temperature, and particularly to controlled-temperature ovens for laboratory and similar uses.

The simplest and lowest cost types of variable-temperature ovens are constructed with "on/off" thermostatic controls. The superiority of proportional-type controls is well known, and such controls are widely available, but their cost differential has heretofore been too great to permit widespread use in relatively inexpensive equipment.

It has heretofore been known that proportional temperature control of an oven may be provided by relatively simple and well known A.C. phase-controlled silicon-controlled rectifier (SCR) circuits, as described for example, in the General Electric Silicon Controlled Rectifier Manual, Second Edition, at pp. 117 and 118. Such controls utilize a transistor circuit having an input provided by an oven-temperature-sensing element and an output which is varied with deviations in oven temperature from the preset temperature desired, to provide a feedback signal which accordingly alters the duration of the conductive portion of an SCR switching circuit during each half-cycle of line current, increasing or decreasing the power applied to the oven heating-element to maintain the preset temperature. However, when a compact unitary oven structure is desired, requiring that the oven and control circuits be contained in a common housing, even though separated by thermal insulation, the heat transfer which takes place between the oven chamber and control-circuit compartment due to the practical limitations of the thermal insulation causes variations in the compartment temperature with changes in the preset temperature of the oven. The well-known temperature sensitivity of the transistor circuit then becomes a severe problem and this, together with other deficiencies of simple systems as heretofore known, has rendered them inadequate to maintain the preset oven temperature substantially constant over any wide range of control temperatures.

In accordance with the invention, a simple circuit is provided which sufficiently compensates for the temperature effects of the transistor or other similar current-controlling element to maintain the desired stability of oven temperature at any preset value within a large range of oven temperatures, for example, having a ratio of maximum excess over room temperature to minimum excess over room temperature of 5 to 1 or more, without necessity for special insulation. Generally stated, this is accomplished by providing suitable temperature-responsive variable resistances in separate input-electrode branches of the transistor circuit so that one such resistance provides the principal compensating effect when the transistor circuit is responding both environmentally and electrically, to oven temperatures in the upper portion of the range, and another such resistance provides the principal compensating effect when the transistor circuit is responding to the oven temperatures in the lower portion of the range. This, together with further aspects of the invention, will be best understood from consideration of the embodiment illustrated in the drawing, in which:

FIGURE 1 is a schematic circuit diagram of an oven control system in accordance with the present invention, the oven chamber being shown in highly schematic form; and FIGURE 2 is a view in orthogonal perspective of an oven unit in accordance with the invention, showing the relative locations of the oven chamber and the control circuit within a common housing.

Before discussing the construction and operation of the control system shown in FIGURE 1, it will be helpful to the understanding of the invention to refer first to FIGURE 2, which illustrates an oven unit having a housing 10 containing an insulated oven chamber 12 in its upper portion and a control circuit 14 in a compartment in its lower portion. Due to the close proximity of the temperature control system circuitry to the oven chamber, the temperature of the oven influences the temperature of the lower compartment and consequently the ambient temperature of the circuitry, where conventional low-cost insulation is employed.

Referring now to FIGURE 1, the oven chamber and the control circuit are indicated by the same respective reference numerals 12 and 14. The oven chamber 12 contains an electrical resistance heating element 16 for heating the chamber to the desired preset temperature and a temperature-sensing thermistor $RT_1$ which is responsive to the chamber temperature. The heating element 16 is connected in series with alternating current lines 20, 22 and a conventional phase-controlled switching circuit 18, the latter comprising a firing circuit 19 and two oppositely poled silicon-controlled rectifiers $SCR_1$ and $SCR_2$ which are responsive to the firing circuit and made alternately conductive for a variable portion of each half-cycle of alternating current, the duration of each period of conduction depending on the magnitude of the input current to the firing circuit 19 on lead 23. This is controlled by a transistor circuit 24 in response to variations of the oven-temperature-sensing thermistor $RT_1$ in a manner which will be discussed in greater detail hereinafter.

Alternating current lines 20 and 22 are also connected across a full-wave rectifier $CR_2$ having one output terminal 25 connected to lead 26 through a current-limiting resistor $R_6$ and another output terminal 28 connected to a ground or reference lead 29; both leads 26 and 29 are connected across a Zener diode Z which supplies a clipped D.C. pulse-form to the firing circuit 19 and the transistor circuit 24.

The A.C. phase-controlled switching circuit 18 is substantially identical to that described in the aforementioned General Electric Manual, but it is described herein for completeness together with the transistor circuit 24 which is constructed in accordance with the invention.

The transistor circuit 24 has a PNP transistor $Q_1$ having base, emitter, and collector electrodes. A bridge-like resistance network is connected to the transistor and is formed by two voltage dividers, the first of which is connected across leads 26 and 29 and has a resistor $R_2$ connected in series with a parallel connected combination of resistor $R_3$ and thermistor $RT_2$, which in turn is connected in series with potentiometer $P_1$, resistor $R_4$, potentiometer $P_2$, and resistor $R_5$. The oven-temperature-sensing thermistor $RT_1$ provides an input signal to the transistor $Q_1$ and is connected across the D.C. pulse-supply lead 26 and the base electrode, in parallel with the series-parallel combination of $R_2$, $R_3$ and $RT_2$. The second divider is connected across lead 26 and the node 30 between potentiometer $P_2$ and resistor $R_5$, and has a resistor $R_{10}$ connected in series with a parallel connected combination of resistor $R_1$ and thermistor $RT_3$, which in turn is connected in series with a forward biased semiconductor diode $CR_1$.

The base electrode of the transistor $Q_1$ is connected to the first divider at node 32 between the parallel combination of $R_3$ and $RT_2$ and the series potentiometer $P_1$, and the emitter electrode is connected to the second divider at node 34 between resistor $R_{10}$ and the parallel combination of $R_1$ and $RT_3$.

Lead 23 connects the collector electrode of transistor $Q_1$ to one side of capacitor $C_1$ through resistor $R_8$, and the other side of capacitor $C_1$ is connected to the reference lead 29 through the primary winding 36 of transformer $T_1$. A unijunction transistor UJT has its emitter electrode connected to resistor $R_8$ and capacitor $C_1$ at 38. The first base electrode 40 is connected to the D.C. pulse supply on lead 26 through a load resistor $R_9$ and the second base electrode 42 is connected directly to the reference lead 29 by lead 44.

Secondary winding 46 and 48 of transformer $T_1$ couple the unijunction transistor firing circuit to the silicon controlled rectifiers and are each connected across the cathode and gate electrodes of $SCR_1$ and $SCR_2$ respectively.

Protective diodes $CR_2$ and $CR_3$ are connected across the cathode and gate electrodes of $SCR_1$ and $SCR_2$ with the polarities shown in FIGURE 1 and a Thyrector THY is connected across both controlled rectifiers for suppression of voltage transients. A radio frequency filter formed by choke $T_2$, capacitor $C_2$, and resistor $R_7$ is provided to suppress R.F. interference, as is conventional in this type of phase-controlled switching circuit.

The temperature adjustment potentiometer $P_2$ has its wiper shaft mechanically coupled to dial 50 (shown in FIGURE 2), and is calibrated for different presettable oven temperatures over a predetermined range. The potentiometer $P_1$ (the adjustment for which is located internally of the housing) sets the calibration of the dial 50. In operation, dial 50 may be set at a particular oven temperature, for example, at a temperature higher than the then present oven temperature, which decreases the resistance between the wiper of $P_2$ and node 30 and decreases the potential on the transistor base (at 32). This increases the amplitudes of the collector current pulses on lead 23 which are fed through resistor $R_8$ to capacitor $C_1$. Resistor $R_8$ and capacitor $C_1$ function as an integrating circuit, producing ramp voltage pulses on the emitter of UJT across $C_1$ and winding 36, and the increase in the amplitudes of the collector current pulses causes UJT to become conductive at an earlier time on each pulse. When UJT becomes conductive on each pulse, capacitor $C_1$ discharges through the unijunction transistor emitter and second base 42 and through the winding 36 of transformer $T_1$, causing a voltage pulse to appear on each of the secondary windings 46 and 48. These pulses are applied between the gate and cathode electrodes of each controlled rectifier, $SCR_1$ and $SCR_2$, and the one which is then being forward biased by the applied A.C. line voltage will become conductive for a longer portion of that half cycle of line voltage. Thus, as each controlled rectifier is conductive for a longer period, there is an increase of power to the heating element 16. When the oven temperature tends to drop, for example, below the preset value, the resistance of thermistor $RT_1$ will increase, and thereby decrease the potential on the base of transistor $Q_1$, increasing the collector current, which will then cause the phase-controlled switching circuit to increase the power to the heating element sufficiently to restore the resistance of $RT_1$. The opposite action will of course occur when the temperature tends to rise above the preset value.

In accordance with the present embodiment of the invention, resistance networks are provided in the transistor base and emitter circuits, each including a housing-temperature-sensing thermistor to compensate for changes in the collector current due to variations in housing temperature, the base network contributing the primary or principal compensating effect at the lower portion of the oven chamber temperature range, and the emitter network contributing the principal compensating effect at the higher portion of the range. The manner of operation of these compensating elements will be described in detail below.

The network resistances in the temperature responsive portion of the transistor base circuit are preferably chosen so that the combined resistance of $R_2$, $R_3$, and $RT_2$ at normal ambient housing temperatures corresponding to oven temperatures at the low end of the range is approximately the same order as the resistance of the oven-temperature sensing thermistor $RT_1$ at the low end of the range. The resistance of $R_2$ is sufficiently higher than the resistance of thermistor $RT_1$ at the upper limit of the oven-temperature range to limit the transistor base current to a suitable amount when the resistances of $RT_1$ and $RT_2$ are both relatively low. The resistance of $RT_2$ should be preferably chosen to be approximately the same order as, or less than, the resistance of $R_3$ at housing temperatures corresponding to oven temperatures at the low end of the range. $R_3$ acts in conjunction with $RT_2$ to provide a suitable effective temperature coefficient for the housing-temperature-responsive portion of the network to provide proper compensation as detailed further below, and $R_3$ may be omitted in certain constructions where the thermistor coefficient alone is adequate.

The network resistances in the temperature-responsive portion of the emitter circuit are preferably chosen so that the resistance of $RT_3$ is substantially greater than $R_1$ at housing temperatures corresponding to relatively low oven temperatures, and about the same order or less at housing temperatures corresponding to the upper range of oven temperatures. The specific values of resistances to achieve the desired compensation and circuit operation for any particular construction may be found by simple experiment from the foregoing and following description.

At low oven temperatures, where the control circuit housing has been heated only a relatively small amount above room temperature, the thermistor $RT_2$ provides the principal compensation by varying the potential on the transistor base with variations in housing temperature, increasing or decreasing the base potential with increasing or decreasing temperature to respectively decrease or increase the collector current a suitable amount. The change of resistance of the thermistor $RT_2$ with variation of housing temperature at relatively low oven and housing temperatures is effective to produce a significant compensating effect since the resistance of $RT_2$ is about the same order as the parallel connected resistor $R_3$, or less, thus effecting a significant change in the resistance of the series parallel network formed by $R_2$, $R_3$, and $RT_2$, and since this network resistance is about the same order as the resistance of $RT_1$, the variations in the resistance of this network significantly affect the resistance of the overall network having $RT_1$ connected in parallel with $R_2$, $R_3$, and $RT_2$, and thus the potential on the transistor base. If, at relatively low oven and housing temperatures, the network resistance of $R_2$, $R_3$, and $RT_2$ is made substantially lower than the resistance of $RT_1$, the effectiveness of resistance variations of $RT_1$ to provide adequate control of the oven temperature may be reduced, while if this network resistance is made substantially higher than the resistance of $RT_1$, the effectiveness of resistance variations of $RT_2$ to provide adequate compensation may be reduced.

The housing-temperature-sensing diode $CR_1$ also aids temperature compensation of the transistor to some extent by varying the emitter potential in the direction to offset changes in collector current produced by variations in housing temperature, and the housing-temperature-sensing thermistor $RT_3$ produces only a small effect at relatively low housing temperatures because of its high ratio of resistance to $R_1$, and substantially no effect at housing temperatures corresponding to the lowest oven temperatures within the range of control temperatures.

Due to the negative temperature coefficient of resistance of the thermistors and their generally logarithmic response to temperature, when the oven temperature is in the upper portion of its range and the control circuit housing has been heated to a relatively high temperature, the oven-temperature-sensing thermistor $RT_1$ will have a low resistance compared to the network resistance of $R_2$, $R_3$, and $RT_2$. This occurs even though the resistance of thermistor $RT_2$ may also be low, since the overall resistance of the series-parallel network cannot be lower than $R_2$ which is desirably substantially higher than $RT_1$ at the upper oven temperature limit. Thus $RT_2$ will affect the transistor compensation relatively little since changes in the resistance of $RT_2$ will housing temperature variations will produce only very small changes in the overall resistance of the network formed by $R_2$, $R_3$, $RT_2$ and $RT_1$, and at housing temperatures corresponding to oven temperatures near the extreme upper limit, the effect of $RT_2$ will be negligible. However, the overall resistance of the resistance network in the emitter circuit will now be significantly affected by changes in housing temperature due to the decrease in the ratio of the resistance of $RT_3$ to $R_1$, so that $RT_3$ is approximately the same order as, or less than, $R_1$. Thus $RT_3$ will now provide the principal compensation for the transistor, decreasing and increasing the emitter potential with increases and decreases in housing temperature.

One desirable construction of the embodiment of the invention illustrated in the drawing, having an oven temperature range of from 50° C. to 300° C., and designed to operate from a 120 volt A.C. line, has been constructed with the following component values:

| | |
|---|---|
| $R_1$ | 270 ohms. |
| $R_2$ | 82K. |
| $R_3$ | 100K. |
| $R_4$ | 47 ohms. |
| $R_5$ | 1K. |
| $R_6$ | 3K. |
| $R_7$ | 47 ohms. |
| $R_8$ | 2.2K. |
| $R_9$ | 820 ohms. |
| $R_{10}$ | 270 ohms. |
| $C_1$ | .1 mfd. |
| $C_2$ | .1 mfd. |
| $CR_1$ | Diode #IN–2070. |
| $CR_2$ | Bridge rectifier #66–8370. |
| $SCR_1$ | Silicon controlled rectifier, Motorola #MCR–2918–5. |
| $SCR_2$ | Silicon controlled rectifier, Motorola #MCR–2918–5. |
| THY | Thyrector, international rectifier, KA 5DBF. |
| $Q_1$ | Transistor, PNP, 2N404. |
| UJT | Unijunction, 2N2646. |
| $T_1$ | Pulse transformer, Viking #PT–4. |
| $T_2$ | Choke coil, Viking #MC–16. |
| Z | Zener diode, international rectifier, #1ZM18T5. |
| $P_1$ | 300 ohms. |
| $P_2$ | 100K. |
| $RT_1$ | Thermistor, Fenwal #GA55P8, 500,000 ohms (25° C.). |
| $RT_2$ | Thermistor, Fenwal #QA51J1, 100,000 ohms (25° C.). |
| $RT_3$ | Thermistor, Fenwal #JA41J1, 10,000 ohms (25° C.). |

If desired, the diode $CR_1$ may be omitted, with, of course, appropriate changes then being made in the resistance values of the temperature-responsive portions of the transistor resistance networks.

Although the embodiment of the invention described herein relates to a temperature control system for an oven, the principles of the invention may also be applied to furnaces or other devices where such temperature control is desirable.

Many modifications of the teachings of the invention will readily be devised by persons skilled in the art. For example, an NPN transistor may of course be substituted for the PNP in the embodiment described, and of course other well known circuit modifications may be made. Accordingly, the scope of the patent protection afforded the invention should not be considered as limited by the particular embodiment and specific construction herein illustrated and described, but should extend to all forms of the invention as defined by the appended claims and equivalents thereof.

What is claimed is:
1. In a controlled-temperature apparatus comprising:
 (a) a chamber the temperature of which is to be controlled,
 (b) a heater in thermal communication with the chamber,
 (c) variable power-supply means coupled to the heater for maintaining the temperature of the chamber at a predetermined temperature, including means for selecting the predetermined temperature within a predetermined range of temperatures, said supply means comprising:
  (i) a current controlling element having first and second input electrodes and an output electrode, and having characteristic variations of output with variations of each input and with the temperature of the element,
  (ii) first circuit means for coupling the first input electrode to a current source,
  (iii) second circuit means for coupling the second input electrode to a current source, and comprising temperature-responsive resistance means responsive to the temperature of the chamber for producing an electrical output from the output electrode indicative of changes in the resistance value thereof, and
  (iv) means coupled to said output electrode for varying power supplied to the heater to restore said resistance value,
the improved apparatus having the variable power-supply means disposed in a housing in close proximity to the chamber so that the temperature of the housing is affected by the temperature of the chamber, and comprising:
 (d) said first circuit means having a first resistance network including second temperature-responsive resistance means for varying the network resistance with variations in housing temperature in the direction to compensate for the temperature characteristic of the current-controlling element when the chamber temperature is within one end portion of the range, but providing substantially constant network resistance with housing temperature variations when the chamber temperature is within the other end portion of the range, and

(e) said second circuit means having a second resistance network including third temperature-responsive resistance means interconnected with said first temperature-responsive means for varying the network resistance with variations in housing temperature in the direction to compensate for the temperature characteristic of the current controlling element when the chamber temperature is within said other end portion of the range, but providing substantially constant network resistance with housing temperature variations when the chamber temperature is within said one end portion of the range, the chamber temperature being maintained constant at any predetermined temperature selected within said predetermined range regardless of the variations in the housing temperature.

2. The apparatus of claim 1 wherein said first, second, and third temperature-responsive resistance means comprise negative temperature-coefficient resistance elements.

3. The apparatus of claim 2 wherein the first resistance network comprises a resistance connected in parallel with the second temperature-responsive resistance means, the latter having a resistance value at low housing temperatures substantially higher than that of the former, so that the parallel network resistance is substantially constant with variations in housing temperature at low chamber temperatures, but of the same order of magnitude as the former at high housing temperatures, so that the parallel network resistance is varied with variations in housing temperature at high chamber temperatures.

4. The apparatus of claim 2 wherein the second resistance network comprises said third temperature-responsive resistance means connected in parallel with said first temperature-responsive resistance means, the former having a resistance value of approximately the same order of magnitude as the latter at chamber temperatures at the low end of the range and substantially higher than the latter at chamber temperatures at the high end of the range so that the resistance of the parallel network is substantially constant with housing temperature variations at high chamber temperatures and varied with housing temperature variations at low chamber temperatures.

5. The apparatus of claim 4 wherein said third temperature-responsive resistance means includes a resistor connected in series with the negative temperature-coefficient resistance element, said resistor having a resistance value substantially higher than that of the first temperature-responsive resistance means at the upper end of the chamber temperature range.

6. The apparatus of claim 5 wherein said third temperature-responsive resistance means includes a further resistor connected in parallel with the negative temperature-coefficient resistance element, the former having a resistance value of at least approximately the same order of magnitude as the latter at low housing temperatures so that the resistance of the parallel combination is varied with housing temperature variations.

7. The apparatus of claim 3 wherein the second resistance network comprises said third temperature-responsive resistance means connected in parallel with said first temperature-responsive resistance means, the former having a resistance value of approximately the same order of magnitude as the latter at chamber temperatures at the low end of the range and substantially higher than the latter at chamber temperatures at the high end of the range so that the resistance of this network is substantially constant with housing temperature variations at high chamber temperatures and varied with housing temperature variations at low chamber temperatures.

8. The apparatus of claim 7 wherein the first, second and third temperature-responsive resistance means comprise thermistors, and said current-controlling element is a transistor.

9. The apparatus of claim 1 wherein the predetermined temperature range of the chamber has a ratio of maximum excess over room temperature to minimum excess over room temperature greater than 5 to 1.

References Cited

UNITED STATES PATENTS

| | | | |
|---|---|---|---|
| 3,040,158 | 6/1962 | Cutler et al. | 219—413 X |
| 3,071,676 | 1/1963 | Sandwyk | 219—413 X |
| 3,128,362 | 4/1964 | Clark et al. | 219—398 |
| 3,231,719 | 1/1966 | De Viney et al. | 219—501 X |
| 3,243,609 | 3/1966 | Kompelien | 219—501 X |

BERNARD A. GILHEANY, *Primary Examiner.*

H. B. GILSON, *Assistant Examiner.*